US009254456B2

(12) United States Patent
Ardes

(10) Patent No.: US 9,254,456 B2
(45) Date of Patent: Feb. 9, 2016

(54) LIQUID FILTER WITH AN ECCENTRIC LIQUID DISCHARGE CHANNEL

(75) Inventor: Wilhelm Ardes, Ascheberg (DE)

(73) Assignee: Hengst SE & Co. KG, Muenster (DE)

( * ) Notice: Subject to any disclaimer, the term of this patent is extended or adjusted under 35 U.S.C. 154(b) by 221 days.

(21) Appl. No.: 14/127,917

(22) PCT Filed: Jun. 11, 2012

(86) PCT No.: PCT/EP2012/061017
§ 371 (c)(1),
(2), (4) Date: Mar. 14, 2014

(87) PCT Pub. No.: WO2012/175359
PCT Pub. Date: Dec. 27, 2012

(65) Prior Publication Data
US 2014/0183116 A1    Jul. 3, 2014

(30) Foreign Application Priority Data
Jun. 20, 2011    (DE) .......................... 10 2011 077 798

(51) Int. Cl.
| | |
|---|---|
| *B01D 35/153* | (2006.01) |
| *B01D 35/16* | (2006.01) |
| *B01D 35/30* | (2006.01) |
| *B01D 35/147* | (2006.01) |
| *B01D 29/88* | (2006.01) |

(52) U.S. Cl.
CPC ............ *B01D 35/306* (2013.01); *B01D 29/88* (2013.01); *B01D 35/147* (2013.01); *B01D 35/153* (2013.01); *B01D 35/16* (2013.01); *B01D 2201/0415* (2013.01); *B01D 2201/291* (2013.01); *B01D 2201/305* (2013.01); *B01D 2201/306* (2013.01); *B01D 2201/316* (2013.01); *B01D 2201/4007* (2013.01); *B01D 2201/4046* (2013.01)

(58) Field of Classification Search
None
See application file for complete search history.

(56) References Cited

U.S. PATENT DOCUMENTS

| | | | | |
|---|---|---|---|---|
| 9,023,203 | B2 * | 5/2015 | Ardes ................. | B01D 35/147 210/167.02 |
| 2012/0261326 | A1 * | 10/2012 | Deschamps et al. ... | B01D 29/96 210/236 |

FOREIGN PATENT DOCUMENTS

| | | | |
|---|---|---|---|
| DE | 1035424 | A1 * | 6/2005 |
| DE | 102009049868 | | 4/2011 |
| DE | 102009054523 | | 6/2011 |

OTHER PUBLICATIONS

International Search Report, Sep. 3, 2012.

* cited by examiner

*Primary Examiner* — Thomas M Lithgow
(74) *Attorney, Agent, or Firm* — Greer, Burns & Crain Ltd.

(57) ABSTRACT

A liquid filter with a replaceable filter insert and a housing having a raw liquid inlet, a central clean liquid outlet, and an eccentric liquid discharge channel. A standpipe extends above the liquid outlet and receives the insert. The insert has an eccentric closing pin. A first positioning arrangement is arranged on the clean liquid outlet and a lower end region of the standpipe so that, when the standpipe is plugged into the clean liquid outlet, the standpipe is guided into a particular position relative to the filter housing. A second positioning arrangement is arranged on the standpipe and the insert so that, when the insert is plugged onto the standpipe, it is guided into a particular position relative to the standpipe. The positioning arrangements are matched to one another so that the closing pin on the insert enters into engagement with the discharge channel in the filter housing.

12 Claims, 16 Drawing Sheets

LIQUID FILTER WITH AN ECCENTRIC LIQUID DISCHARGE CHANNEL

CROSS-REFERENCES TO RELATED APPLICATIONS

This application claims the benefit of the German patent application No. 10 2011 077 798.9 filed on Jun. 20, 2011, the entire disclosures of which are incorporated herein by way of reference.

BACKGROUND OF THE INVENTION

The present invention relates to a liquid filter, in particular an oil or fuel filter of an internal combustion engine, having a filter housing and a filter insert exchangeably situated therein, the filter housing having a raw liquid inlet, a central clean liquid outlet, and an eccentric liquid discharge channel, a central standpipe being situated over the clean liquid outlet, and the filter insert being plugged onto the standpipe, and the filter insert having an eccentric closing pin on its side facing the liquid discharge channel, and positioning means being provided that, when the filter insert is plugged onto the standpipe, guide the closing pin into engagement with the eccentric liquid discharge channel.

A liquid filter of the type named above is known from DE 10 2009 049 868 A1. In this liquid filter, the standpipe is fashioned as a tube-shaped dome, and is a part of the filter housing. When the filter insert is put into place, the tube-shaped dome engages in an internal space of the filter insert. At a free end of the tube-shaped dome, a guide contour is provided that works together with a guide element situated on the filter insert in order to guide the eccentric sealing pin into a position that fits with the eccentric liquid discharge channel during installation of the filter insert.

In this known liquid filter, it is regarded as disadvantageous that the standpipe is realized in one piece with the filter housing, which limits the shape given to the standpipe to relatively simple shapes, because standardly the filter housing is produced as a pressed part or injection-molded part made of light metal or plastic, and therefore can only have contours that can be demolded from an injection mold.

SUMMARY OF THE INVENTION

The object of the present invention is therefore to create a liquid filter of the type named above in which the production-related limitations are avoided, and whose installation is nonetheless simple.

According to the present invention, this object is achieved by a liquid filter of the type named above that is characterized in that
the central standpipe is a separate component that can be connected to the clean liquid outlet by a plug connection,
first positioning means are provided on the central clean liquid outlet and on a lower end region of the standpipe that, when the standpipe is plugged into the clean liquid outlet, guide the standpipe into a particular position in the circumferential direction relative to the filter housing,
second positioning means are provided on the outer circumference of the standpipe and on the inner circumference of the filter insert that, when the filter insert is plugged onto the standpipe, guide the filter insert into a particular position in the circumferential direction relative to the standpipe, and
the first and second positioning means are matched to one another in such a way that the closing pin on the filter insert enters into engagement with the eccentric liquid discharge channel in the filter housing.

Advantageously, the liquid filter according to the present invention has two different positioning means that on the one hand position the standpipe in a particular position in the circumferential direction relative to the filter housing and that on the other hand position the filter insert in a particular position in the circumferential direction relative to the standpipe. Here it is essential that the various positioning means are matched to one another in such a way that the closing pin on the filter insert is positioned in a fitting manner relative to the liquid discharge channel in the filter housing. The standpipe can thus be produced as a separate individual part, so that production-related limitations are not present that exist in the case of a one-piece manufacture together with the filter housing. A false positioning of the standpipe, seen in the circumferential direction, during its assembly in the filter housing is excluded by the first positioning means. The second positioning means provide the necessary orientation of the filter insert in the circumferential direction relative to the filter housing when the filter insert is installed, without requiring directly interacting positioning means on the filter insert and on the filter housing. The filter insert is a mass-produced part produced in automated fashion in a standard manner, so that within the automatic production sequence, the correct situation of the positioning means at the filter insert relative to the closing pin can be realized easily, and in particular without manual intervention. As needed, further separate positioning means can also be provided inside the filter insert, on the individual parts thereof. Overall, in this way a very simple assembly, secured against errors, of the liquid filter is ensured, both during its initial installation and also during later maintenance sessions that include an exchange of the filter insert.

An advantageous development of the liquid filter according to the present invention provides that the standpipe, the filter insert, and a screw cover of the filter housing can be pre-assembled to form a unit that as a whole can be connected to the filter housing to form the liquid filter, with automatic positioning of the closing pin and liquid discharge channel. In such a preassembled unit, the filter insert is already correctly positioned relative to the standpipe in the circumferential direction by the second positioning means. Through the connection of the preassembled unit to the filter housing, the standpipe, which here is a part of the preassembled unit, moves into engagement with the clean liquid outlet and is positioned relative to the filter housing in the circumferential direction by the first positioning means provided there in such a way that ultimately the closing pin on the filter insert is positioned in a manner fitting the liquid discharge channel. The preassembled unit can for example be produced and preassembled at a supplier of an automobile manufacturer, and can then be supplied to the automobile manufacturer, where the preassembled unit then only has to be connected to the filter housing, in a simple working step.

For the correct positioning of the standpipe relative to the filter housing, as a rule a self-rotation of the standpipe relative to the filter housing is required. In order to produce this rotation of the standpipe when the preassembled unit is joined to the filter housing, a locking means system that can be brought into and out of engagement is usefully provided respectively on the standpipe and on the filter insert, and on the filter insert and on the filter housing screw cover, the locking means system between the filter insert and the filter housing screw cover being a locking means system that transmits torques limited to a specifiable magnitude and that permits a rotation relative to one another. Thus, within the preassembled unit there is the locking means system that connects the screw cover and the filter insert to one another, and the locking means system that transmits a limited torque and that permits a rotation of the filter housing screw cover and filter insert relative to one another, while at the same time the filter insert and the standpipe are indeed likewise locked with one another inside the preassembled unit by means of the further locking means system, but cannot be rotated relative to one another.

In a concrete further embodiment, it is preferably provided that the first positioning means at the filter housing side is formed by a tube base having an upper side that runs obliquely and/or in stepped fashion and that goes over into an axial slot, and at the standpipe side by a dog that protrudes radially outward. In this embodiment, the first positioning means are simple to produce and at the same time reliable in their functioning.

A further preferred embodiment of the liquid filter proposes that the second positioning means at the standpipe side is formed by a pair of guide webs that run symmetrically to one another obliquely downward toward one another, going over into an axial slot, and at the filter insert side by a dog that protrudes radially inward. In this way, a simple production with reliable functioning is ensured for the second positioning means as well.

In order to house the above-mentioned dog forming the positioning means at the filter insert so as to be protected against external influences, it is preferably provided that the filter insert has a hollow cylindrical filter material body in whose hollow interior there is situated a grid-type supporting body to which the radially inward-protruding dog is connected or with which it is made in one piece.

In order to promote the production of the filter insert of the liquid filter according to the present invention as well, the present invention proposes that the filter insert has two end plates enclosing the hollow cylindrical filter material body at its ends, and that the closing pin be made in one piece with, or connected to, one of the end plates.

Because in the liquid filter according to the present invention the standpipe is a separately produced individual part, it can be equipped with additional functional elements relatively easily. For this purpose, it is preferably provided that the standpipe is perforated at least in the upper half of its height, and that a filter bypass valve is situated in an upper end region of the standpipe. In this way, the filter bypass valve can be housed inside the liquid filter in a particularly space-saving fashion and without expensive assembly steps.

A further embodiment proposes that a valve seat that works together with a valve body of the filter bypass valve is fashioned on the end plate of the filter insert that is the upper end plate in the/an installed position. In this way, whenever the filter insert is replaced a new valve seat is made available for the filter bypass valve, providing for reliable and disturbance-free operation of the filter bypass valve over a long period of time.

In addition, the present invention proposes that a no-load blocking valve be situated in or on a lower region of the standpipe. In this way, the standpipe is given a further function in addition to or alternatively to the filter bypass valve.

Preferably, a valve body of the no-load blocking valve works together with the lower end of the standpipe, fashioned as valve seat. In this embodiment of the present invention, the standpipe has the additional function of a valve seat for the no-load blocking valve, thus achieving an advantageously simple production and assembly with regard to the no-load blocking valve as well.

Finally, according to the present invention it is provided that the standpipe, when plugged together with the clean liquid outlet, can be locked or clamped to the filter housing in such a way that when the filter insert is withdrawn from the standpipe the standpipe remains in the clean liquid outlet. This embodiment is useful in particular in connection with the above-described preassembled unit, because after the first installation of the filter, during later regular filter maintenance only the filter insert has to be exchanged. For this purpose, the detaching force for the locking or clamping connection between the standpipe and filter housing is usefully sufficiently greater than the detaching force of the locking connection between the filter insert and the standpipe; at the same time, the detaching force of the locking connection between the screw cover and the filter insert is usefully greater than the detaching force of the locking connection between the filter insert and the standpipe but smaller than the detaching force of the locking or clamping connection between the standpipe and the filter housing. The named detaching force relations provide that when the screw cover is removed this cover carries the filter insert, locked therewith, along with it and withdraws it from the standpipe without also pulling the standpipe out of the filter housing. At the same time, the withdrawal of the filter insert provides a movement of the closing pin out of the liquid discharge channel, thus emptying the filter housing and enabling the filter insert to be practically free of liquid when removed from the filter housing.

BRIEF DESCRIPTION OF THE DRAWINGS

In the following, exemplary embodiments of the present invention are explained on the basis of a drawing.

DETAILED DESCRIPTION OF THE PREFERRED EMBODIMENTS

Figure 1:
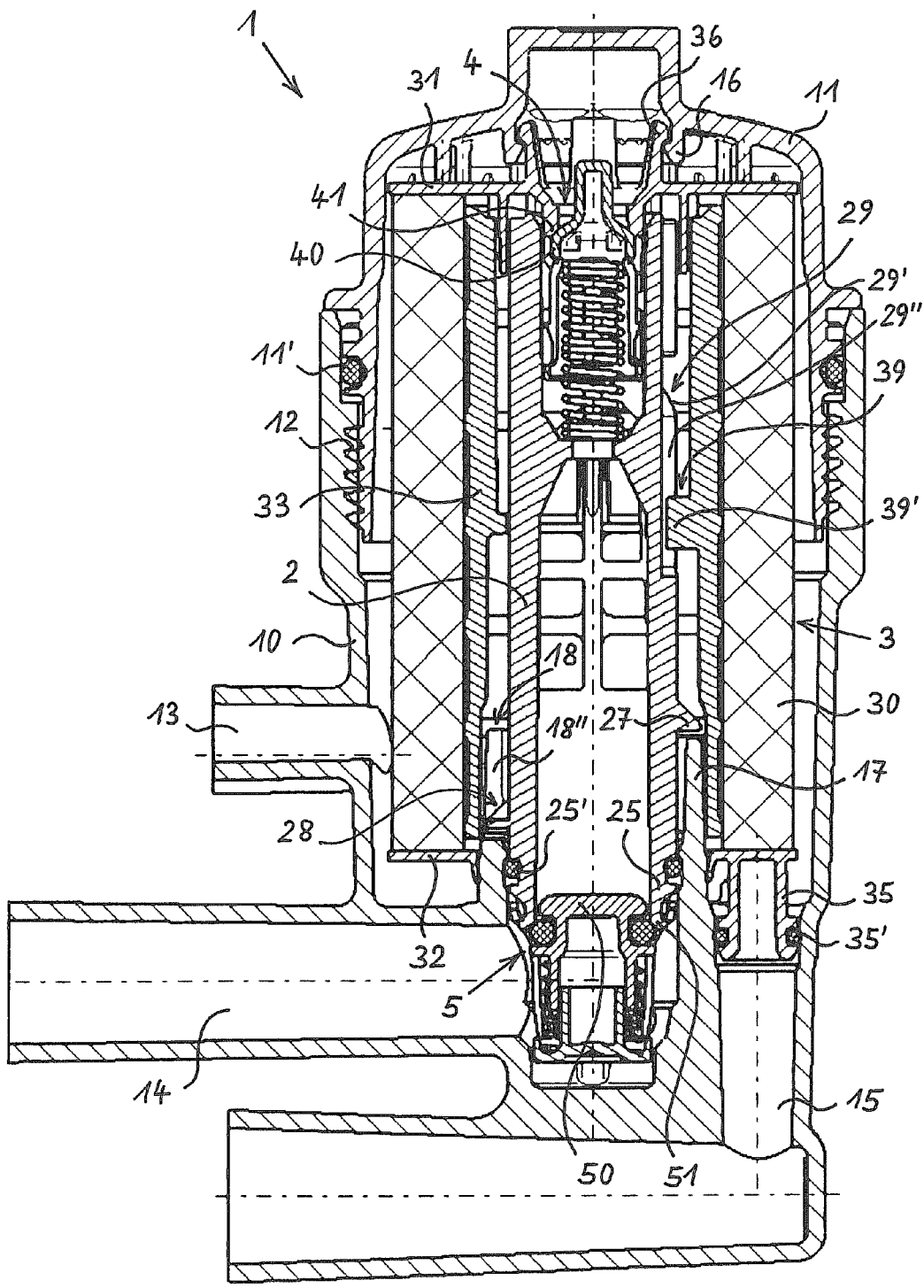
FIG. 1 shows a liquid filter in a first longitudinal section.

FIG. 1 of the drawing shows a liquid filter 1, in particular an oil or fuel filter of an internal combustion engine, in a longitudinal section, in its completely assembled state ready for operation. Liquid filter 1 is realized as a standing filter having a cup-shaped filter housing 10 and a screw cover 11 at its upper side. In the interior of filter housing 10, a filter insert 3 is situated on a standpipe 2. Standpipe 2 is inserted with its lower end 51 in sealing fashion into a tube base 17 that is a part of filter housing 10.

Filter housing 10 has a runoff liquid inlet 13 that is realized here in the form of a tube connection and that opens into filter housing 10 from the outside in the radial direction. Parallel to raw liquid inlet 13, and displaced downward therefrom, there runs a clean liquid outlet 14 that is also realized as a tube connection and that leads away from filter housing 10 in the radial direction. At the bottom in FIG. 1, a liquid discharge channel 15 is situated on filter housing 10, which channel goes out from the base of the interior of housing 10 at a radially eccentric point, and then turns so that it runs parallel to channels 13 and 14.

Standpipe 2 is realized as a closed tube over a lower part of its height, and is perforated thereabove. In an upper end region of standpipe 2, a filter bypass valve 4 is situated therein, having a valve body 41 that is preloaded in the closing direction by a spring. Valve body 40 works together with a valve seat 41 that is integrally formed on an upper end plate 31 of filter insert 3. Filter bypass valve 4 permits a flow to pass through liquid filter 1 while bypassing filter insert 3 when this insert is clogged by dirt particles.

On the lower end of standpipe 2, in clean liquid outlet 14 there is situated a no-load blocking valve 5 having a valve body 50 that works together with a valve seat 51 fashioned on lower end 25 of standpipe 2. No-load blocking valve 5 prevents no-load operation of liquid filter 1 when no liquid is conveyed through liquid filter 1 by an external conveying device such as a pump, which is the case for example when there is a standstill of an associated internal combustion engine.

The lower end of filter insert 3 is formed by a second, lower end plate 32, the two end plates 31 and 32 enclosing between themselves a hollow cylindrical filter material body 30. In the interior of filter material body 30 there is situated, between the two end plates 31 and 32, a hollow cylindrical grid-shaped supporting body 33 that radially inwardly supports hollow cylindrical filter material body 30 when there is a flow through it, in order to prevent filter material body 30 from collapsing when there is a flow through it. A closing pin 35 that protrudes axially downward is fashioned in one piece with lower end plate 32 and is situated eccentrically thereon, said pin bearing a sealing ring 35' and engaging in sealing fashion in liquid discharge channel 15.

Screw cover 11, which seals filter housing 10 at its upper side, is screwed onto filter housing 10 by a screw threading 12, with interposition of a sealing ring 11'. Locking means 16, here in the form of locking hooks, are integrally formed in one piece on the underside of cover 11, in a central upper region thereof. These locking means 16 work together with locking means 36 which are integrally formed in one piece in the upper side of upper end plate 31 of filter insert 3. Locking means 16 and 36 can be brought into and out of engagement in the axial direction, and in addition are realized in such a way that they can transmit a limited torque in the circumferential direction, screw cover 11 and filter insert 3 being capable of being rotated relative to one another when the limited torque is exceeded.

Further locking means not visible in FIG. 1 are provided between filter insert 3 and standpipe 2, and are further explained below on the basis of FIG. 2.

In order to ensure that, during assembly of liquid filter 1, closing pin 35 moves into a position that is ready for engagement with liquid discharge channel 15, first and second positioning means are provided on liquid filter 1. Here, first positioning means 18 and 28 are situated on tube base 17 and on standpipe 2, and second positioning means 29 and 39 are situated on standpipe 2 and on filter insert 3.

First positioning means 18, situated at the filter housing side, is formed here by a ramp-shaped upper side 18' of tube base 17, going over into an axial slot 18". In the lower region of standpipe 2, on the outer circumference thereof there is integrally formed a radially outward-protruding dog 28', as first positioning means 28 at the standpipe side, which, during installation of standpipe 2, guides the standpipe, regarded in the circumferential direction, into a defined position relative to filter housing 10. In FIG. 1, standpipe 2 is shown in this position. By means of a sealing ring 21', standpipe 2 is sealed against filter housing 10, and moreover is at the same time locked or clamped to filter housing 10 in order, after a one-time insertion of standpipe 2 into tube base 17, to prevent a withdrawal of standpipe 2 during a change of the filter insert. As needed, separate locking or clamping elements can be provided here in addition to sealing ring 21'.

As second positioning means 29 at the standpipe, in the upper region thereof on the outer circumference of standpipe 2, a system of two guide webs 29' is integrally formed that run symmetrically and obliquely downward toward one another and go over into an axial slot 29". As second positioning means 39 at the filter insert, here a radially inward-protruding dog 39' is provided on the inner circumference of supporting body 33 of filter insert 3. Second positioning means 29 and 39 ensure that when filter insert 3 is plugged onto standpipe 2, filter insert 3 assumes a defined position, regarded in the circumferential direction, relative to standpipe 2. Here, first positioning means 18 and 28 and second positioning means 29 and 39 are matched to one another in such a way that, in the assembled state of liquid filter 1, as shown in FIG. 1, closing pin 35 on lower end plate 32 of filter insert 3 is forced into the position in which it is ready for engagement with liquid discharge channel 15.

During operation of liquid filter 1, a liquid that is to be filtered flows through raw liquid inlet 13, into the region of filter housing 10 situated radially outside filter material body 30 of filter insert 3. From there, the liquid flows through filter material body 30 radially inward from the outside, support body 33 supporting filter material body 30 against collapse. From the interior of filter insert 3, the now-filtered liquid flows inward and downward through standpipe 2 into clean liquid outlet 14. Liquid discharge channel 15 is sealed in liquid-tight fashion by sealing pin 35 during the operation of liquid filter 1.

During maintenance of liquid filter 1 involving a change of filter insert 3, screw cover 11 is screwed off from filter housing 10, such that screw cover 11 carries filter insert 3 along with it via locking means 16 and 36, and pulls filter insert 3 off from standpipe 2. At the same time, closing pin 35 is withdrawn from liquid discharge channel 15, resulting in an emptying of liquid from filter housing 10. Filter insert 3 removed from housing 10 is then practically free of residual liquid.

Figure 2:
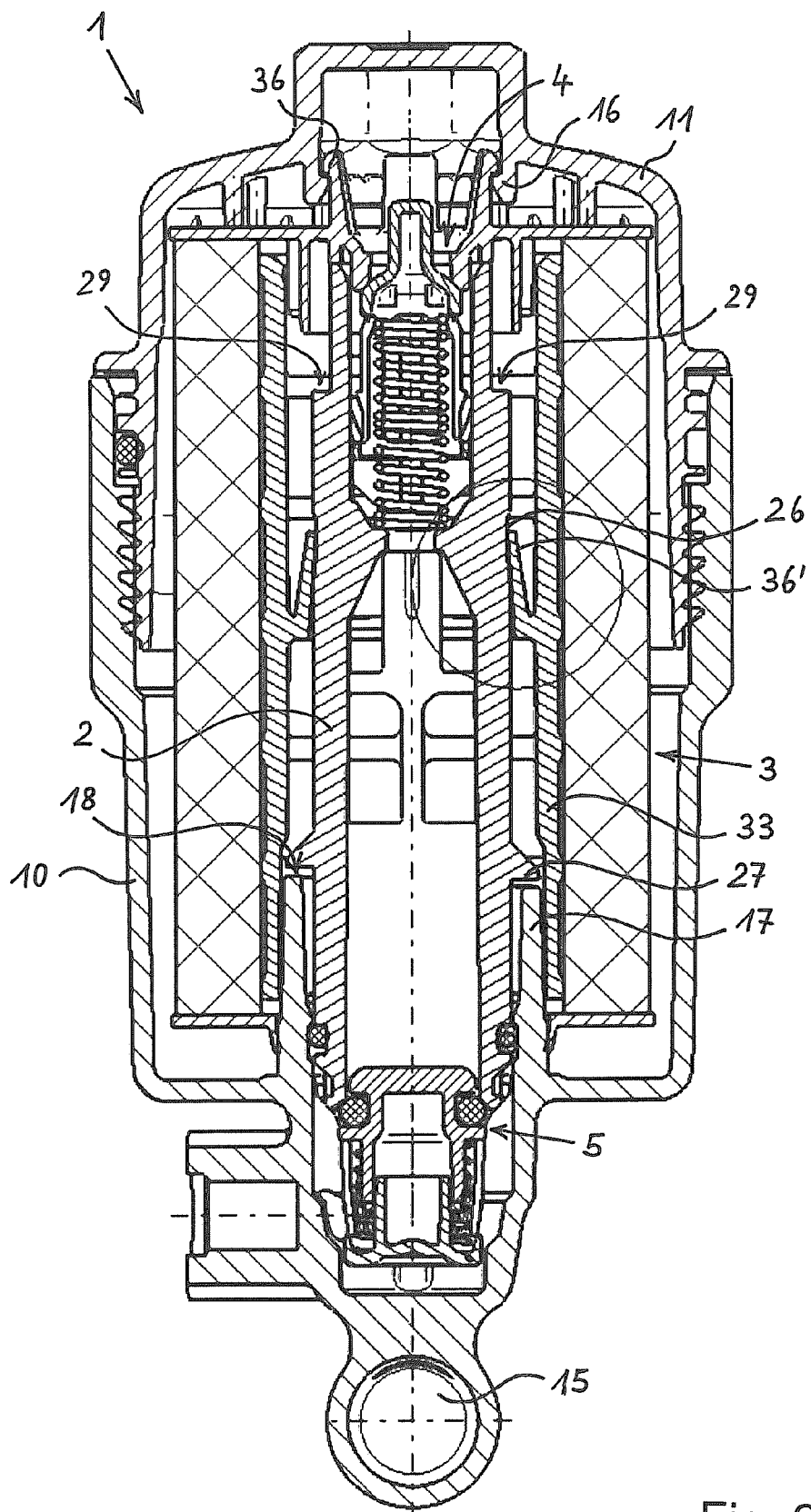
FIG. 2 shows the liquid filter in a second longitudinal section, rotated by 90° relative to FIG. 1.

FIG. 2 of the drawing shows liquid filter 1 of FIG. 1 in a second longitudinal section, rotated relative to that of FIG. 1 by approximately 90°. The outer part of liquid filter 1 forms filter housing 10 thereof having screw cover 11. Inside liquid filter 1, filter insert 3 is situated on standpipe 2. Standpipe 2 is inserted into tube base 17. Alternatively, standpipe 2 can also be plugged externally onto tube base 17.

In the upper region of standpipe 2, filter bypass valve 4 is situated. At the lower end of standpipe 2, no-load blocking valve 5 is visible.

The upper side of tube base 17 forms first positioning means 18 at the filter housing side. The first positioning means at the standpipe side is not visible in FIG. 2, because it is situated outside the sectional plane. In the upper region of standpipe 2, on the outer circumference thereof second positioning means 29 at the standpipe side are visible; the associated second positioning means of filter insert 3 is not visible here due to its situation outside the sectional plane.

As explained above, filter insert 3 and screw cover 11 are locked to one another by locking means 16 and 36 in such a way that cover 11 can transmit axial tensile and pushing forces, and can transmit a limited torque in the circumferential direction to filter insert 3. If the limited torque is exceeded, there occurs a relative rotation of screw cover 11 relative to filter insert 3. By means of further locking means 26 and 36', filter insert 3 and standpipe 2 are locked to one another in such a way that standpipe 2 is secured against falling out from filter insert 3, as long as standpipe 2 is connected only to filter insert 3 and not yet to filter housing 10. Here, second locking means 26 on standpipe 2 and 36' on support body 33 of filter insert 3 are realized in such a way that they are capable of transmitting limited axial tensile forces.

Figure 3:
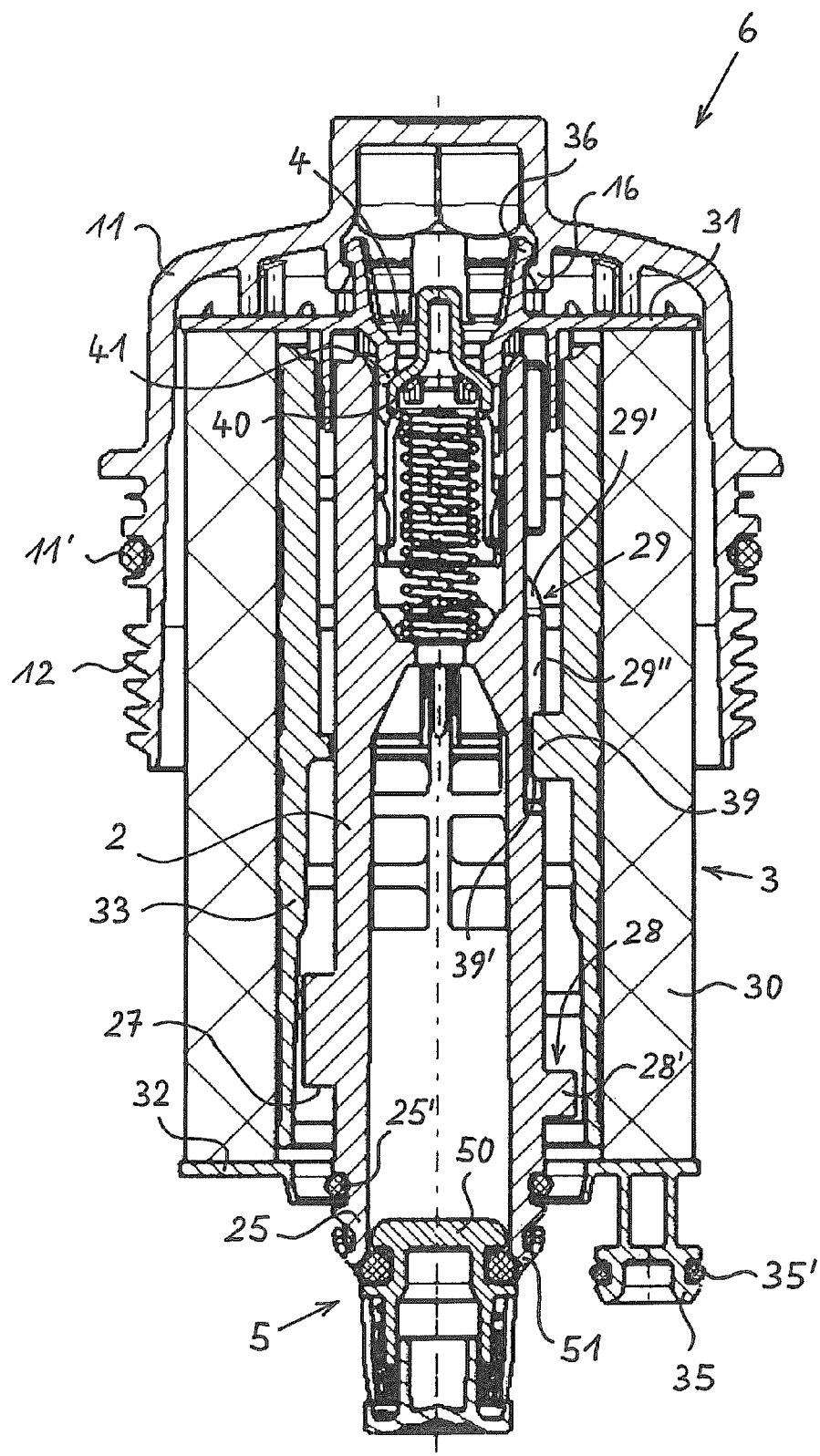
FIG. 3 shows a preassembled unit made up of a filter insert, a standpipe, and a filter housing screw cover, in longitudinal section.

The above-described locking means make it possible to connect screw cover 11, filter insert 3, and standpipe 2 to one another to form a preassembled unit 6, as is shown in FIG. 3 in a longitudinal section. In order to form this preassembled unit 6, screw cover 11 and filter insert 3, as well as standpipe 2 and filter insert 3, are connected and locked to one another in an arbitrary sequence by axial plugging together, first locking means 16 and 36 and second locking means (not shown in FIG. 3 but shown in FIG. 2) 26 and 36' entering into engagement with one another. When standpipe 2 and filter insert 3 are connected to one another, their positioning means 29 and 39 also move into engagement with one another and guide filter insert 3 into a defined position relative to standpipe 2, viewed in the circumferential direction. In the state in which they are locked together, locking means 16 and 36, and 26 and 36', hold the individual parts of constructive unit 6 together with adequate security, so that constructive unit 6 can be connected to the filter housing as a whole in a following assembly step, which can also take place at a different location.

In order to connect preassembled unit 6 to filter housing 10, unit 6 is introduced from the top into filter housing 10, which is open at its upper side, first positioning means 18 and 28 ensuring that standpipe 2 moves into a defined position relative to filter housing 10, regarded in the circumferential direction. In most cases, because the position of standpipe 2 relative to filter housing 10 at the beginning of the assembly is completely arbitrary, standpipe 2 will here not yet assume the desired defined position relative to filter housing 10. By rotating screw cover 11, which is connected to filter insert 3 via locking means 16 and 36, standpipe 2, which is connected in rotationally fixed fashion to filter insert 3, is rotated about itself until first positioning means 18 and 28 move into an engagement-ready position relative to one another. As soon as this engagement-ready position has been reached, a further rotation of standpipe 2 is prevented by positioning means 18 and 28, and only cover 11 is then still rotated, in its further rotation for the further screwing into screw threading 12, relative to filter insert 3 and standpipe 2, without standpipe 2 itself then rotating along with it. For the connection of preassembled unit 6 to filter housing 10, it is thus sufficient to screw screw cover 11 together with filter housing 10, it being automatically ensured during this that closing pin 35 on filter insert 3 moves into its position fitting liquid discharge channel 15, as is visible in FIG. 1.

Figure 4:
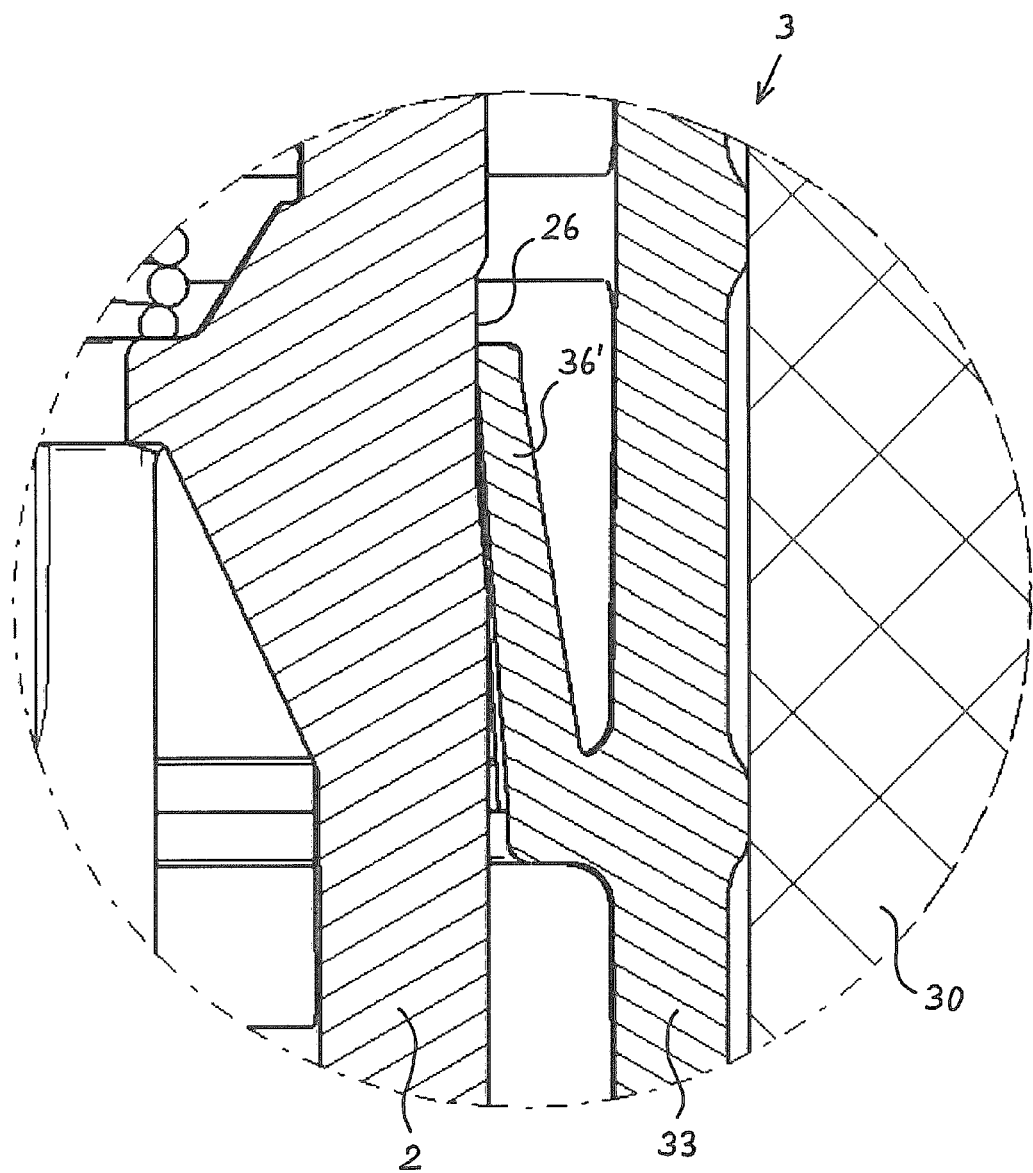
FIG. 4 shows the detail circled in FIG. 2 and FIG. 3, in an enlarged representation.

In FIG. 4, the detail circled in FIG. 2 and FIG. 3 is shown in an enlarged representation. Here, the interaction of locking means 26 of standpipe 2 and locking means 36' of filter insert 3 can be seen particularly clearly. Concretely, locking means 26 is realized as a recess, springing back slightly in the radially inward direction, of the outer circumference of standpipe 2. Unlocking means 36' on filter insert 3 is here concretely realized in the form of a plurality of locking tongues situated at a distance from one another in the circumferential direction. The locking tongues forming locking means 36' are here fashioned in one piece with support body 33, which supports filter material body 30 radially inwardly, of filter insert 3, for which purpose support body 33 is usefully made of an elastic plastic.

Figure 5:
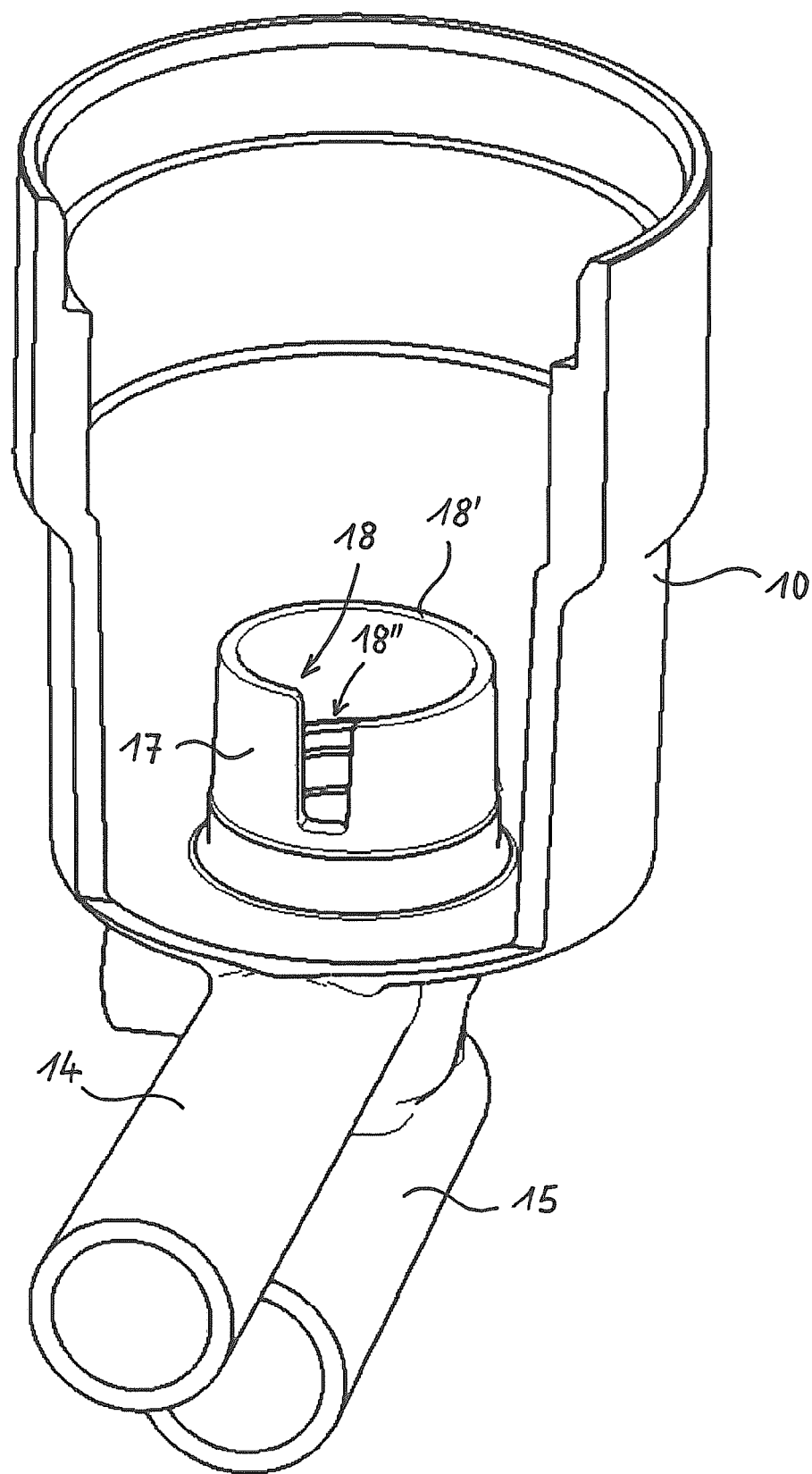
FIG. 5 shows the filter housing of the liquid filter from FIGS. 1 and 2, in a sectional view.

FIG. 5 shows filter housing 10 of liquid filter 1 from FIGS. 1 and 2, housing 10 being shown here in a partly sectional view. Filter housing 10 has a cup-shaped basic shape. In the center of filter housing 10, upward-protruding tube base 17 is integrally formed on the base of the filter housing. The upper end face of tube base 17 forms first positioning means 18 at the filter housing. Concretely, upper side 18' is fashioned as a helical ramp, upper side 18' going over into an axial slot 18" in a region between the highest and the lowest point of upper side 18'.

Through the interior of tube base 17 there runs clean liquid outlet 14 for filtered liquid, going over further down into a radially outward-running tube connection. Liquid discharge channel 15 runs underneath clean liquid outlet 14.

Figure 6:
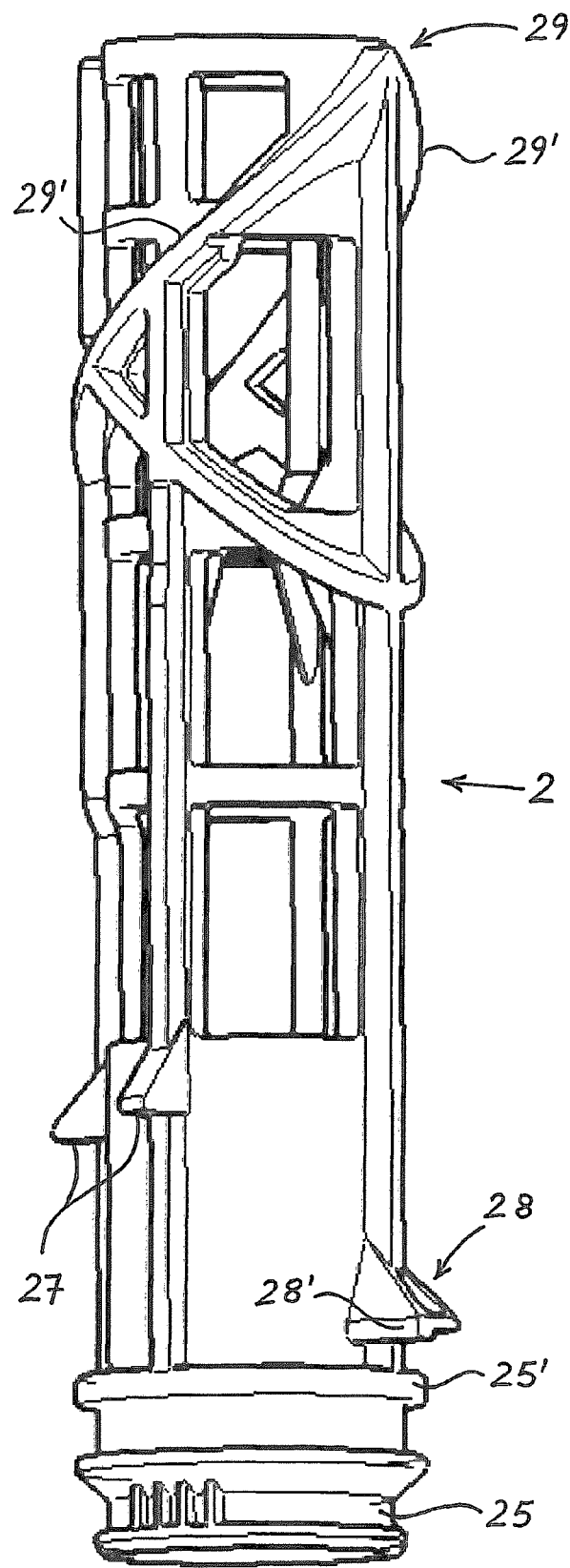
FIG. 6 shows the standpipe of the liquid filter from FIGS. 1 and 2 in a first view.
Figure 7:
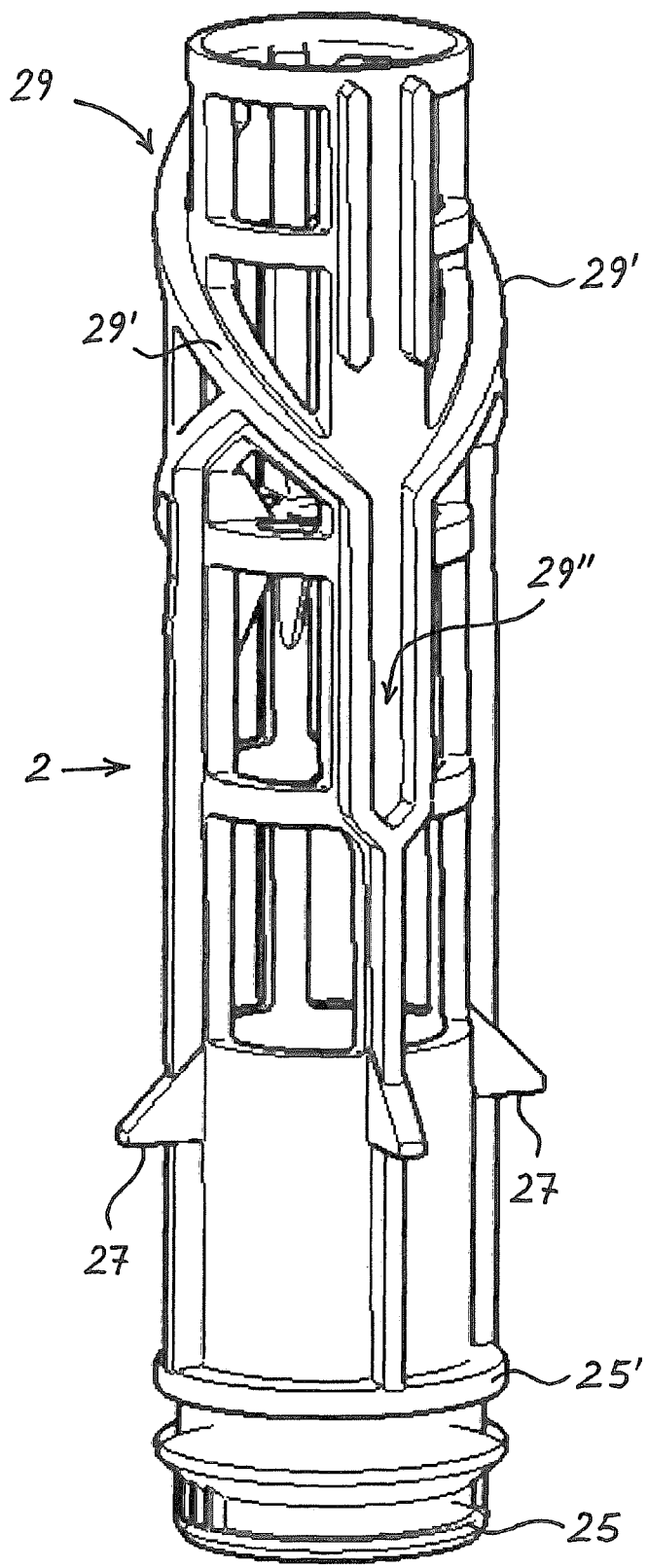
FIG. 7 shows the standpipe of FIG. 6 in a second view rotated relative to FIG. 6.

In FIGS. 6 and 7, standpipe 2 of liquid filter 1 of FIGS. 1 and 2 is shown in two different views rotated relative to one another. Over the lower part of its height, standpipe 2 is closed; above this, standpipe 2 is made with perforations in the pattern of a grid. With its lower end 25, standpipe 2 can be inserted into the tube base of the filter housing, sealing ring 25' providing a liquid-tight connection.

Near lower end 25 of standpipe 2, in FIG. 6 first positioning means 28 at the standpipe side is visible in the form of radially outward-protruding dog 28'. At an axial distance above this, a plurality of radially outward-protruding stops, also in the form of dogs, are integrally formed on the outer circumference of standpipe 2. When liquid filter 1 is finally assembled, these stops 27 are situated on the upper side of the tube base of the filter housing.

In the upper region of standpipe 2, realized there in the manner of a grid, there is situated second positioning means 29 at the standpipe side, formed by two guide webs 29' that run symmetrically to one another over the outer circumference of standpipe 2, running in opposite circumferential directions and toward one another. Guide webs 29' work together with the second positioning means on the inner circumference of filter insert 3, described above. Depending on the initial position in which the positioning means at the filter insert meet one of guide webs 29', filter insert 3, in its movement downward on standpipe 2, is rotated either to the right or to the left in order to bring it into the defined position relative to standpipe 2.

In FIG. 7, it can be seen how the two guide webs 29' forming positioning means 29 run together to form axially running slot 29". As soon as the positioning means at the filter insert side has moved into slot 29", a rotation of filter insert 3 and standpipe 2 relative to one another is blocked; however, further axial displacement relative to one another remains possible.

Figure 8:
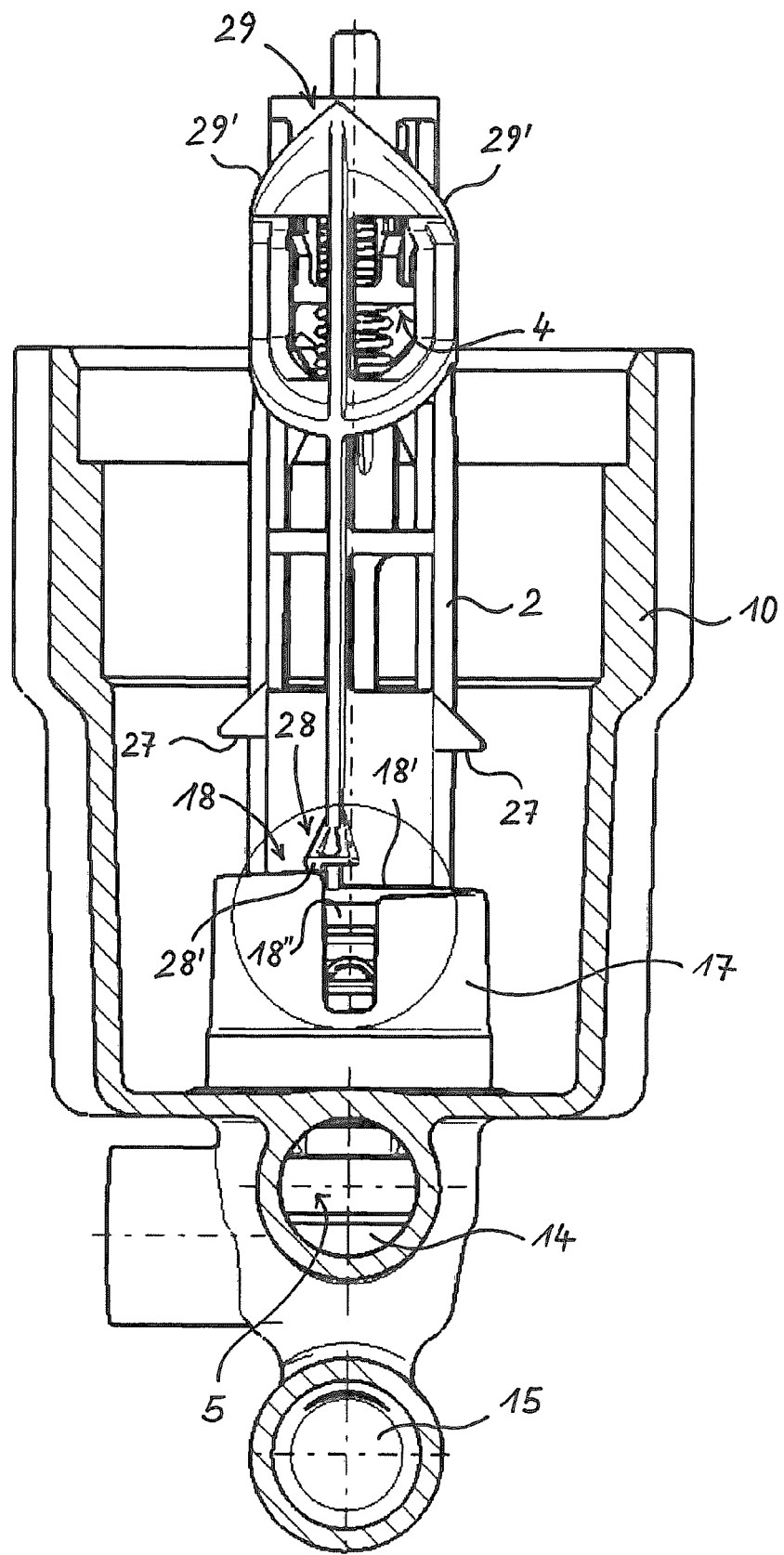
FIG. 8 shows the filter housing in a sectioned view, together with the standpipe, at the beginning of the installation of the standpipe.

FIG. 8 shows filter housing 10 together with standpipe 2 at the beginning of the mutual connection. When standpipe 2 is axially introduced with its lower end into tube base 17, dog 28', forming first positioning means 28 on standpipe 2, meets upper side 18' of tube base 17 at an arbitrary, accidental point in the circumferential direction. Through rotation of standpipe 2 in the clockwise direction, which can be brought about either manually directly at standpipe 2 or indirectly through rotation of screw cover 11, dog 28' moves along upper side 18' of tube base 17 until dog 28' moves into the region of slot 18".

Figure 9:
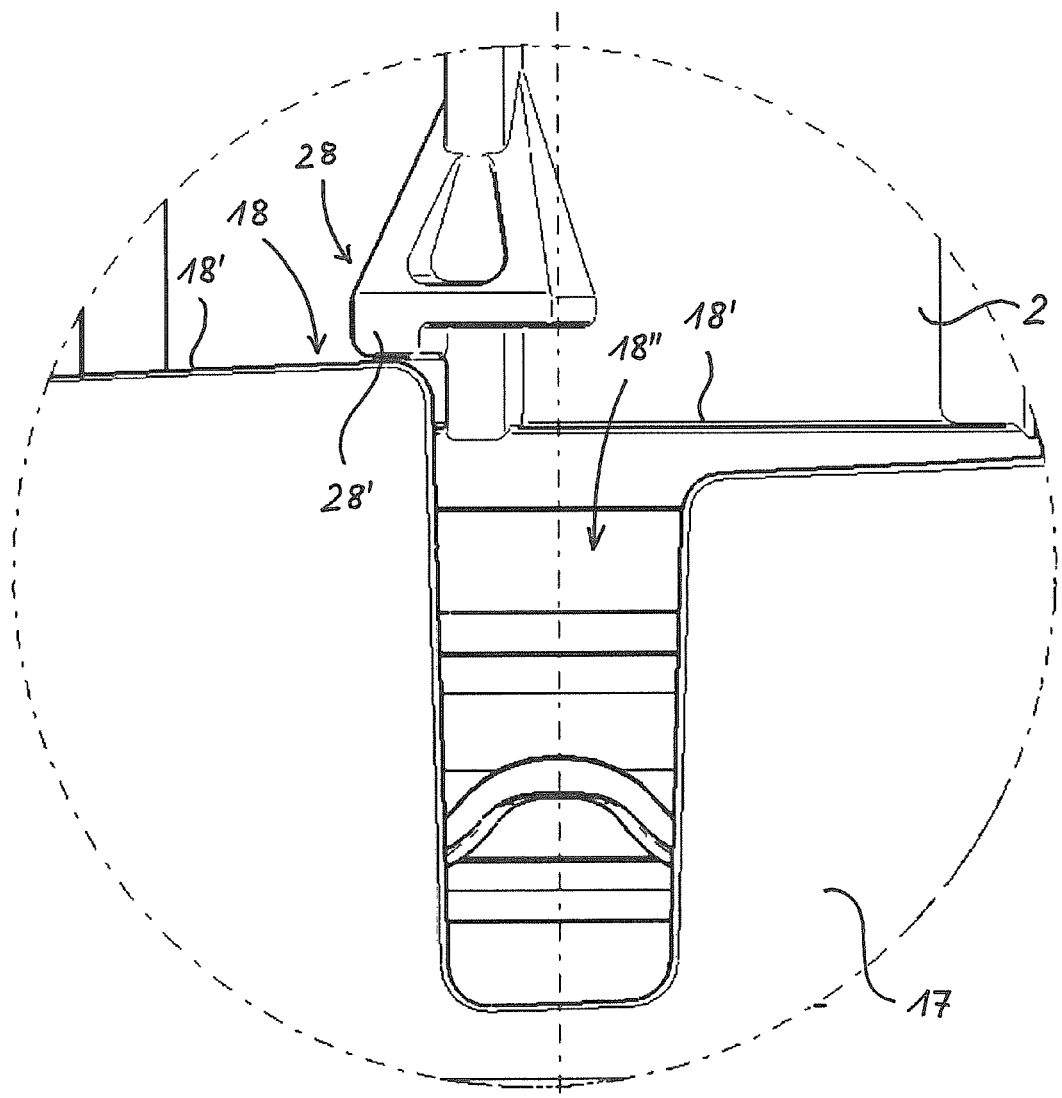
FIG. 9 shows the detail circled in FIG. 8 in an enlarged representation.

The state shown in FIG. 8 is shown again in FIG. 9 as an enlarged detail. Here, dog 28' is situated at the left next to slot 18", and is situated at the highest region of upper side 18' of tube base 17. In the background, the further curve of upper side 18' of tube base 17 can be seen. Facing the viewer is, again, axial slot 18" in tube base 17.

Figure 10:
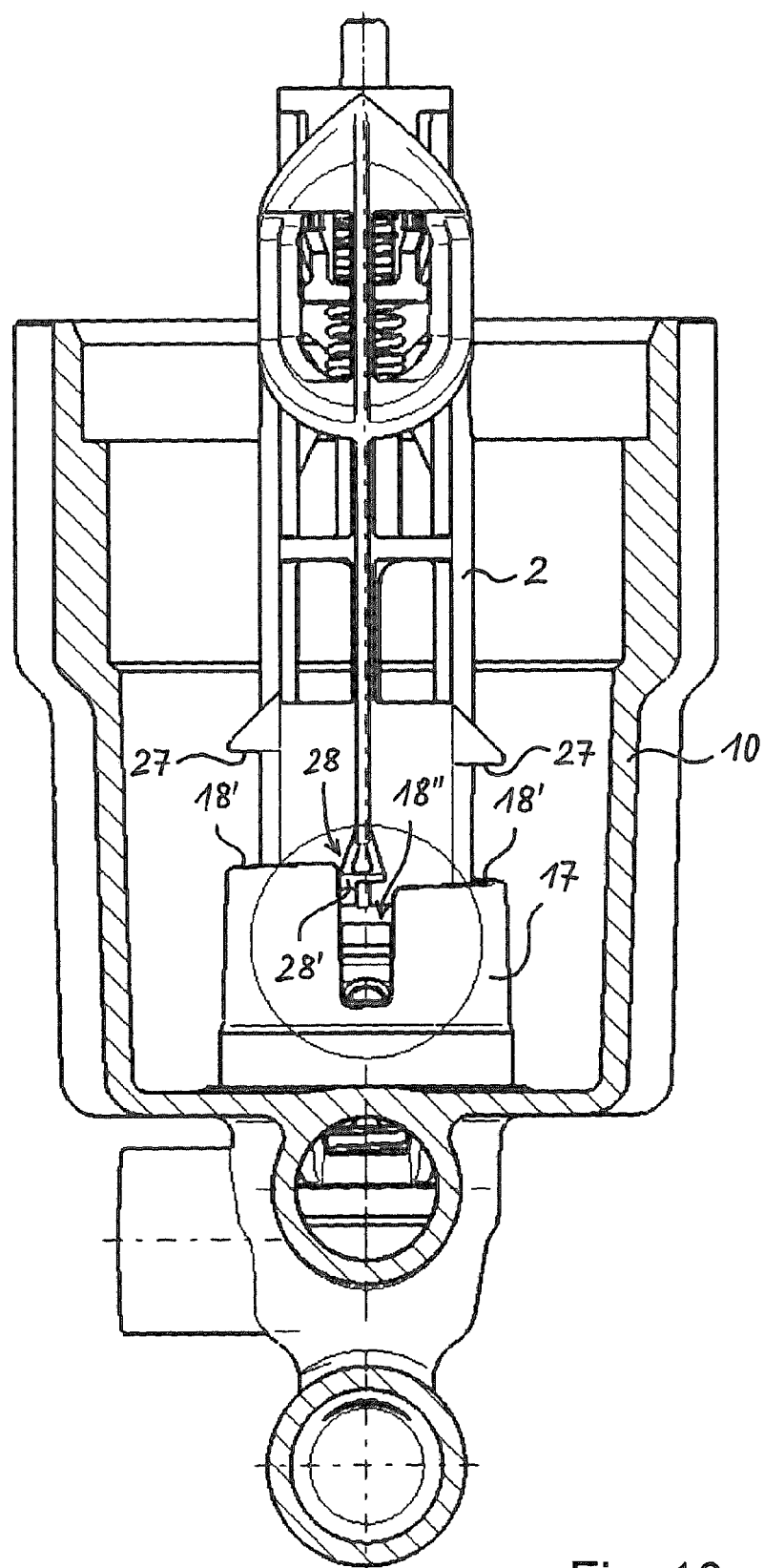
FIG. 10 shows the filter housing in a sectioned view, together with the standpipe, during a second phase of the installation of the standpipe.

FIG. 10 shows standpipe 2 in a position in which dog 28', after a rotation of standpipe 2 by approximately 180°, stops against the left (in FIG. 10) limitation of axial slot 18", blocking a further rotation of standpipe 2 relative to tube base 17 and to the rest of filter housing 10.

Figure 11:
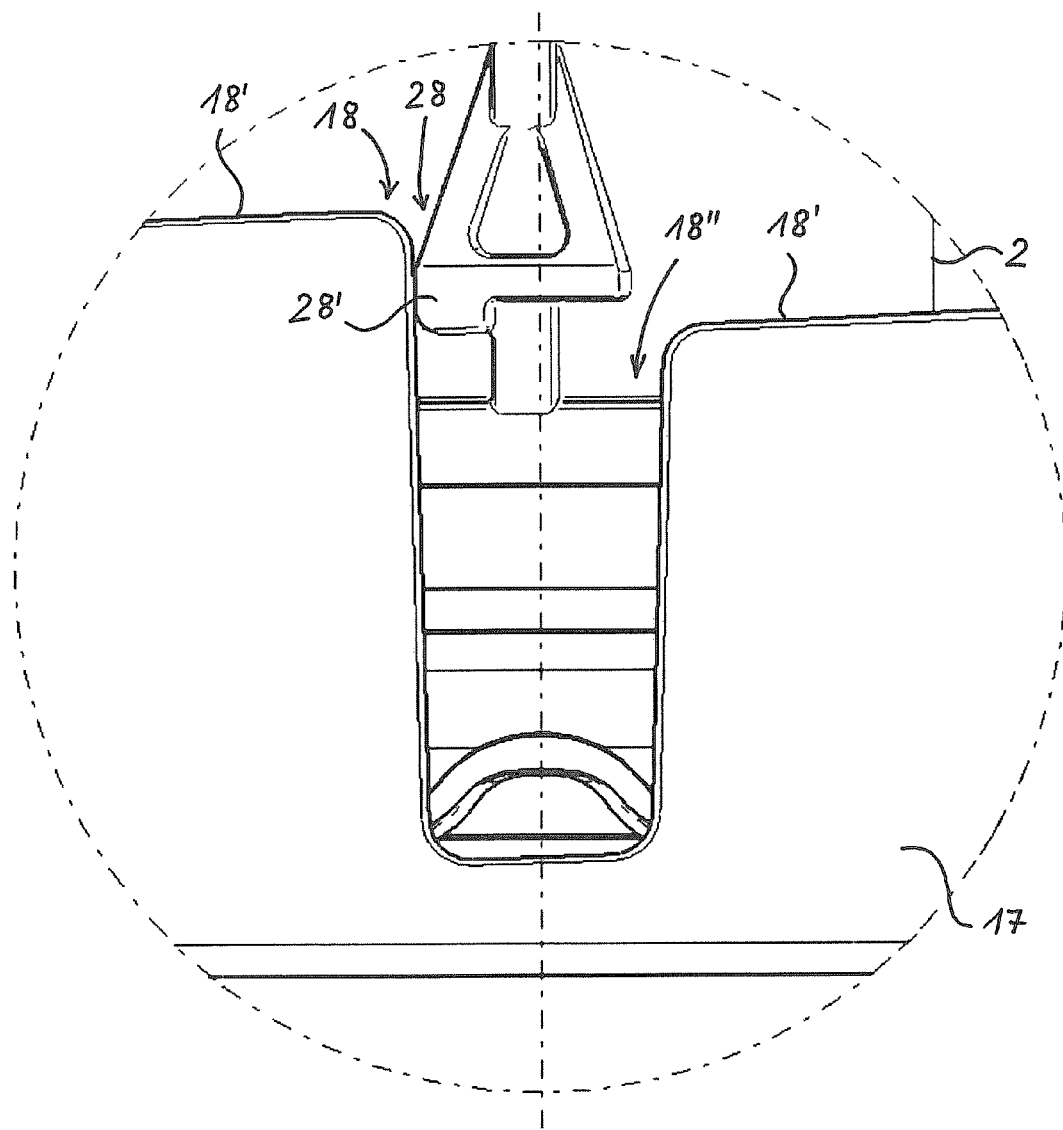
FIG. 11 shows the detail circled in FIG. 10, in an enlarged representation.

This position of dog 28' is again shown in FIG. 11 as an enlarged detail.

Figure 12:
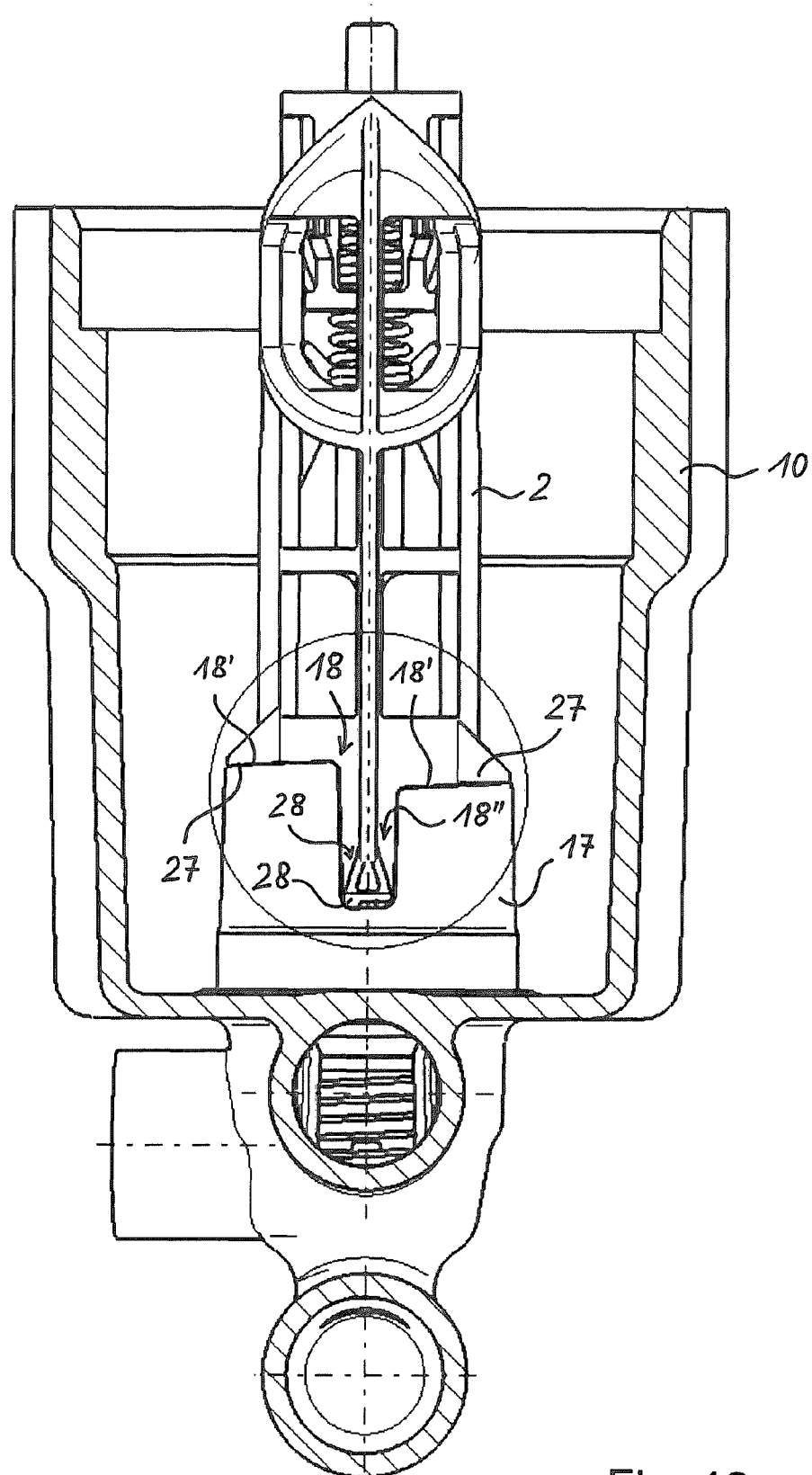
FIG. 12 shows the filter housing in a sectioned view, together with the standpipe, at the end of the installation of the standpipe.

In FIG. 12, standpipe 2 is displaced, without further rotation relative to tube base 17, downward into its final assembled position. In this final position, dog 28' is situated at the lower end of slot 18". At the same time, stops 27 lie against upper side 18' of tube base 17.

Figure 13:
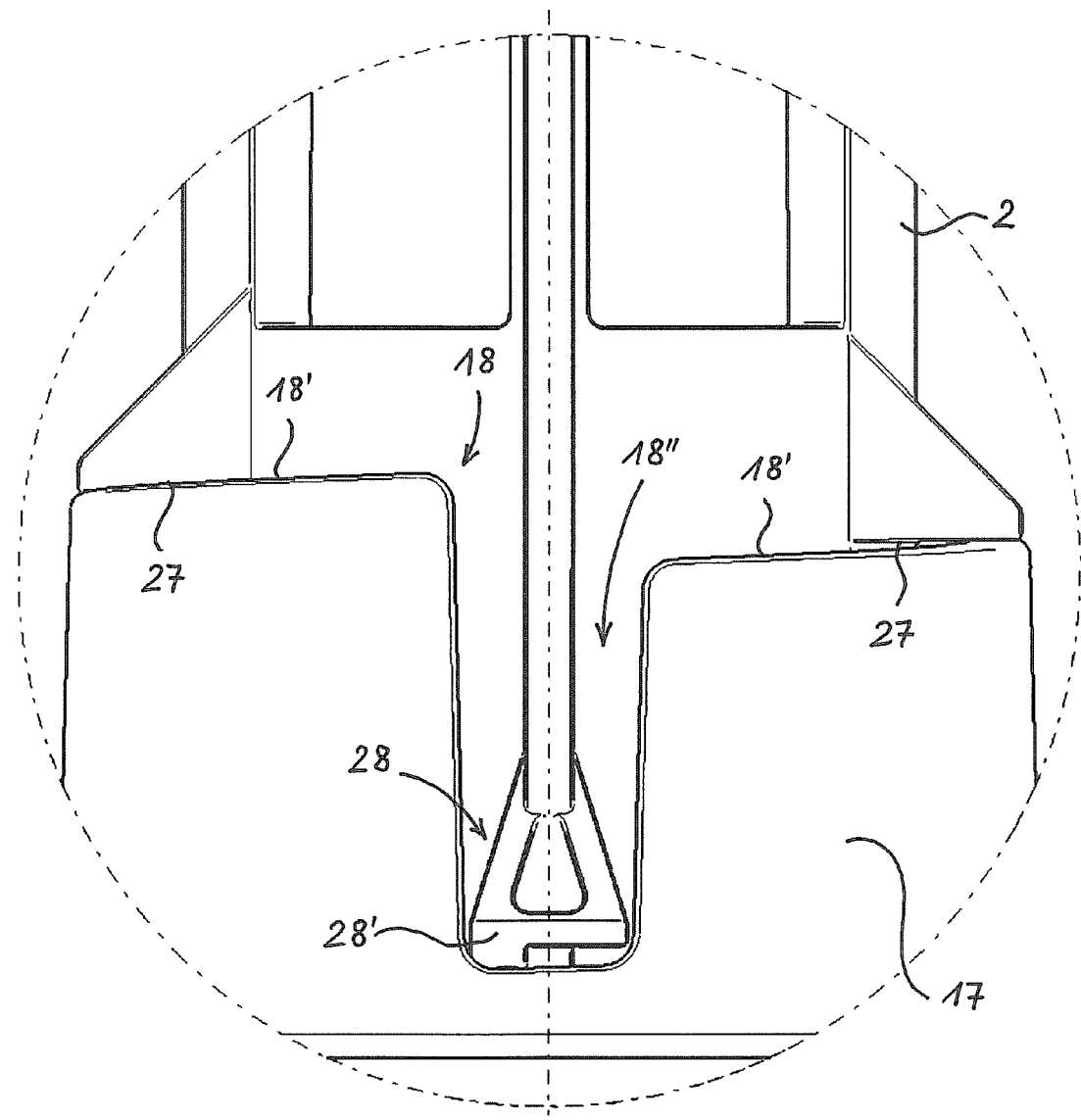
FIG. 13 shows the detail circled in FIG. 12, in an enlarged representation.

In FIG. 13, the detail circled in FIG. 12 is again shown in an enlarged representation. With regard to the reference characters in the enlarged details according to FIGS. 9, 11, and 13, reference is made to the description of FIGS. 8, 10, and 12.

Figure 14:
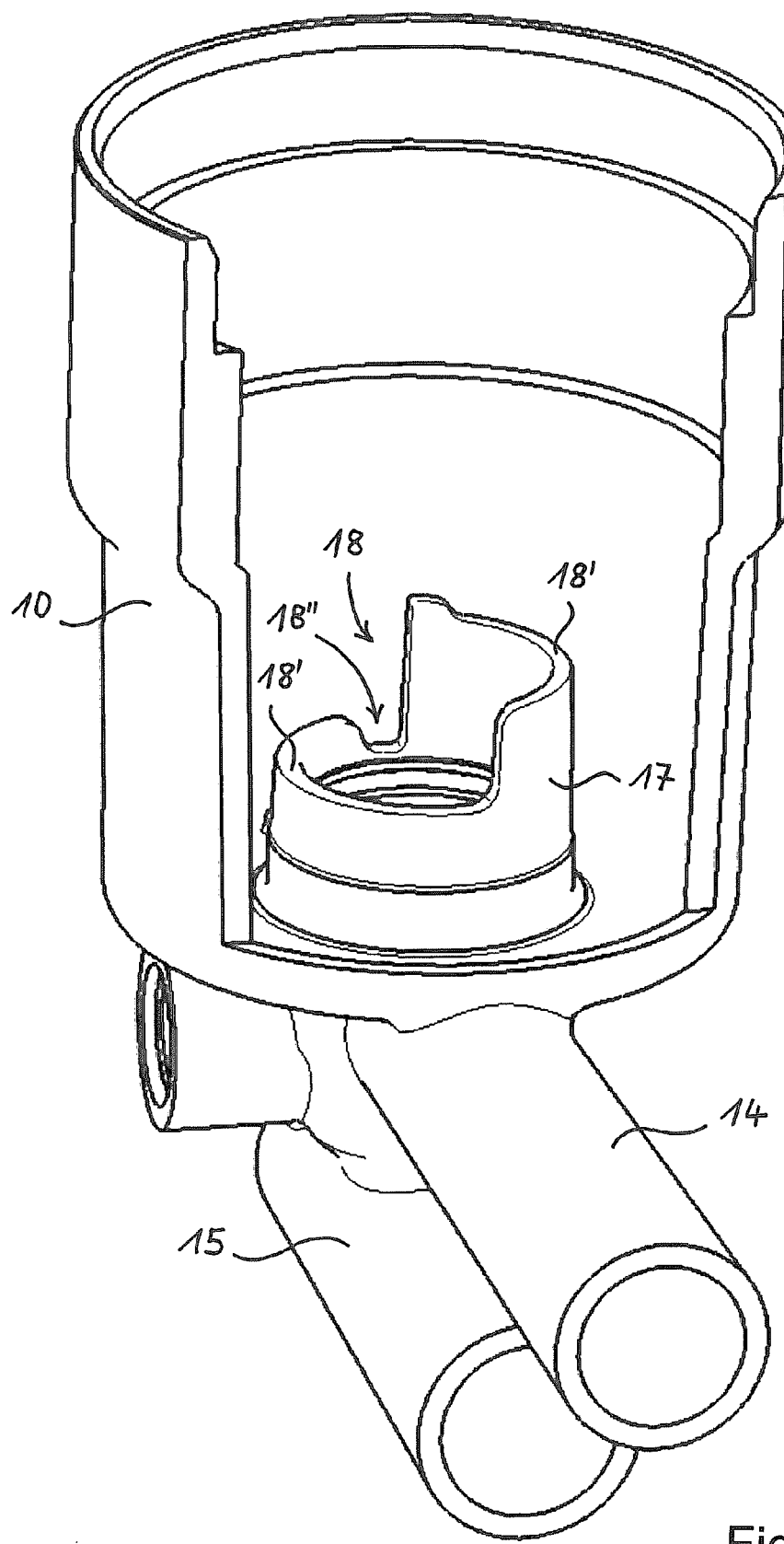
FIG. 14 shows the filter housing of the liquid filter in an embodiment modified relative to that of FIG. 5, in a sectioned view.

FIG. 14 shows an alternative embodiment of filter housing 10, filter housing 10 according to FIG. 14 differing from filter housing 10 according to FIG. 5 in the realization of first positioning means 18 on tube base 17. In the embodiment of filter housing 10 according to FIG. 14, it is characteristic of positioning means 18 on tube base 17 that upper side 18' is divided into two segments having different heights, the height changing discontinuously between the segments in the form of steps. Slot 18", running axially through tube base 17, is situated on the step from the low segment to the high segment of upper side 18', regarded in the clockwise direction. In its remaining parts, filter housing 10 corresponds to the embodiment according to FIG. 5.

Figure 15:
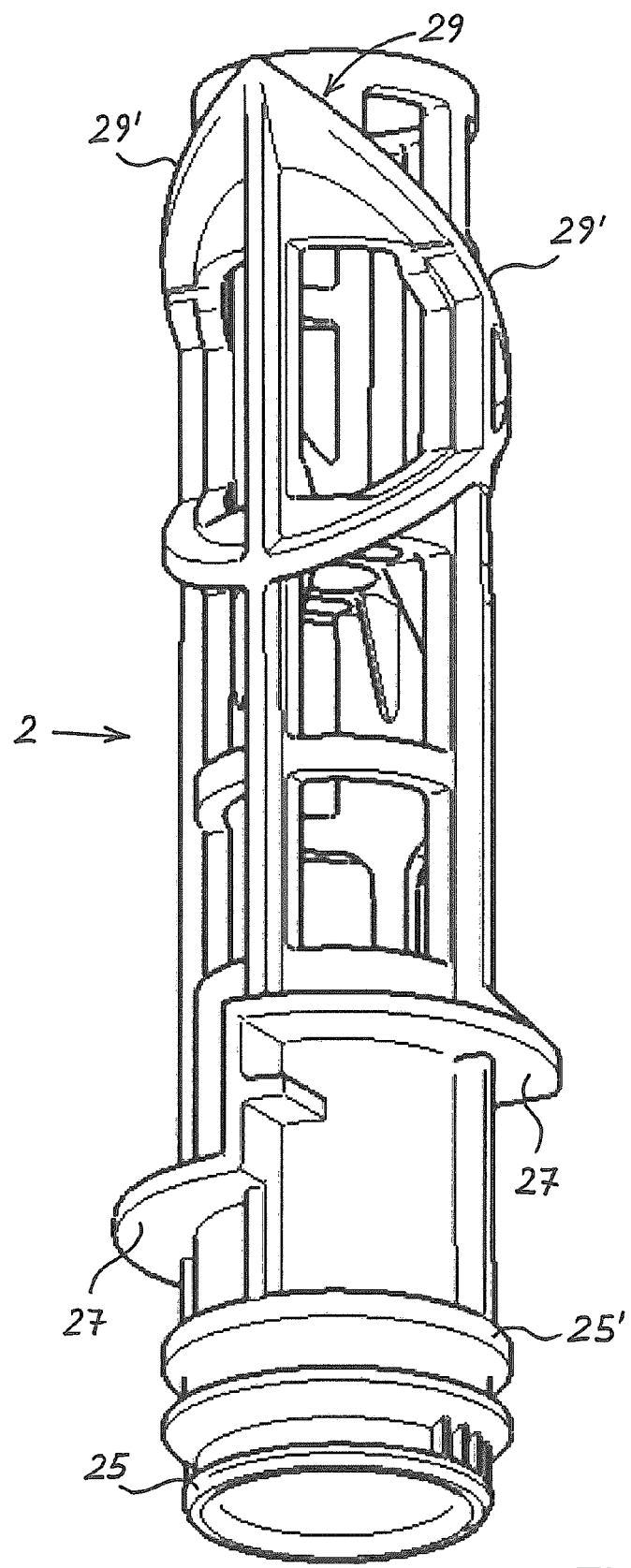
FIG. 15 shows a standpipe fitting the filter housing of FIG. 14, in a first view.
Figure 16:
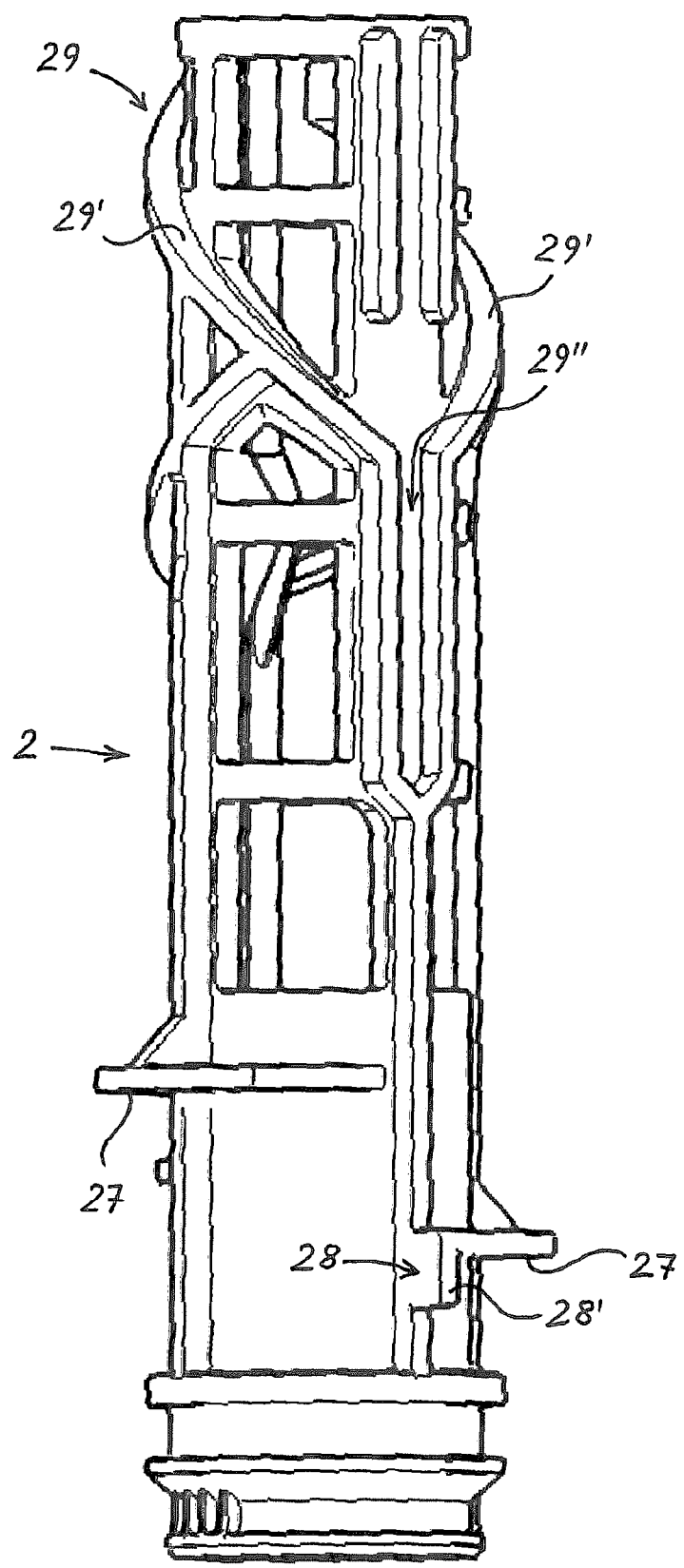
FIG. 16 shows the standpipe of FIG. 15 in a second view, rotated relative to FIG. 15.

FIGS. 15 and 16 show two different views of a standpipe 2 that fits filter housing 10 according to FIG. 14. Matching the realization of tube base 17, stops 27 are also made in stepped fashion close to lower end 25 of standpipe 2. Sealing ring 25' is situated between lower end 25 and stops 27 of standpipe 2. Standpipe 2 is again realized in the manner of a grid in its upper part, and is there realized with second positioning means 29 in the form of the two guide webs 29', which agree with second positioning means 29 on the above-described embodiments of standpipe 2.

In FIG. 16, which shows standpipe 2 in a view rotated relative to FIG. 15, at the bottom on standpipe 2 its first positioning means 28 is visible in the form of protruding dog 28'. Displaced thereto in the circumferential and axial direction, stepped stops 27 are integrally formed. At the top on standpipe 2, the two guide webs 29', running to one another obliquely, can be seen, which then go over into slot 29", running axially further downward.

In order to achieve low-cost mass production, and in order to ensure the necessary stability and durability, filter housing 10 is usefully a pressure-molded part made of light metal such as aluminum or magnesium. Standpipe 2, and plates 31 and 32, and support body 33 of filter insert 3, and screw cover 11, are usefully injection-molded parts made of a thermoplastic plastic material such as polyimide, for reasons of cost and weight.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 liquid filter
10 filter housing
11 screw cover of 10
11' sealing ring on 11
12 screw threading
13 raw liquid inlet
14 clean liquid outlet
15 liquid discharge channel
16 locking means on 11
17 tube base
18 first positioning means on 10
18' upper side of 17
18" slot
2 standpipe
25 lower end
25' sealing ring on 25
26 locking means on 2
27 stop
28 first positioning means on 2
28' dog
29 second positioning means on 2
29' guide webs
29" slot
3 filter insert
30 filter material body
31 first (upper) end plate
32 second (lower) end plate
33 support body
35 closing pin
35' sealing ring on 35
36 locking means on 31
36' locking means on 33
39 second positioning means on 3
39' dog
4 filter bypass valve
40 valve body
41 valve seat
5 no-load blocking valve
50 valve body
51 valve seat
6 preassembled unit

The invention claimed is:

1. A liquid filter comprising:
a filter housing and a filter insert exchangeably situated therein,
the filter housing having a raw liquid inlet, a central clean liquid outlet, and an eccentric liquid discharge channel,
a central standpipe being situated above the clean liquid outlet,
the filter insert being plugged onto the standpipe,
the filter insert having an eccentric closing pin on its side facing the liquid discharge channel, and positioning means being arranged such that, when the filter insert is plugged onto the standpipe, the positioning means guide the closing pin into engagement with the eccentric liquid discharge channel,
the central standpipe being a separate component that connects to the clean liquid outlet by a plug connection,
first positioning means arranged on the central clean liquid outlet and on a lower end region of the standpipe that, when the standpipe is plugged into the clean liquid outlet, guide the standpipe into a particular position in the circumferential direction relative to the filter housing,
second positioning means arranged on the outer circumference of the standpipe and on the inner circumference of the filter insert that, when the filter insert is plugged onto the standpipe, guide the filter insert into a particular position in the circumferential direction relative to the standpipe, and
the first and second positioning means being matched to one another in such a way that the closing pin on the filter insert enters into engagement with the eccentric liquid discharge channel in the filter housing.

2. The liquid filter as recited in claim 1, wherein the standpipe, the filter insert, and a filter housing screw cover can be preassembled to form a unit that can be connected as a whole to the filter housing, with automatic positioning of the closure pin and liquid discharge channel, to form the liquid filter.

3. The liquid filter as recited in claim 2, wherein on the standpipe and on the filter insert, and on the filter insert and on the filter housing screw cover, in each case a locking means system is provided that can be brought into and out of engagement, of which the locking means system between the filter insert and the filter housing screw cover is a locking means system that transmits torques limited to a specifiable magnitude and that permits a rotation relative to one another.

4. The liquid filter as recited in claim 1, wherein the first positioning means are formed at the filter housing side by a tube base having an upper side that runs at least one of obliquely and in stepped fashion and that goes over into an axial slot, and are formed at the standpipe side by a dog that protrudes radially outward.

5. The liquid filter as recited in claim 1, wherein the second positioning means are formed at the standpipe side by a pair of guide webs that run symmetrically to one another obliquely downward toward one another, and that go over into an axial slot, and are formed at the filter insert side by a dog that protrudes radially inward.

6. The liquid filter as recited in claim 5, wherein the filter insert has a hollow cylindrical filter material body in whose hollow interior there is situated a grid-type supporting body with which the radially inward-protruding dog is one of connected and made in one piece.

7. The liquid filter as recited in claim 6, wherein the filter insert has two end plates that enclose the hollow cylindrical filter material body at its ends, and wherein the closing pin is one of, made in one piece with and connected to, one of the end plates.

8. The liquid filter as recited in claim 1, wherein the standpipe is perforated at least in the upper half of its height, and wherein a filter bypass valve is situated in an upper end region of the standpipe.

9. The liquid filter as recited in claim 8, wherein a valve seat that works together with a valve body of the filter bypass valve is fashioned on an end plate of the filter insert that is an upper end plate in an installed position.

10. The liquid filter as recited in claim 1, wherein a no-load blocking valve is situated in or on a lower region of the standpipe.

11. The liquid filter as recited in claim 10, wherein a valve body of the no-load blocking valve works together with the lower end, fashioned as valve seat, of the standpipe.

12. The liquid filter as recited in claim 1, wherein the standpipe, when it is plugged together with the clean liquid outlet, can be locked or clamped to the filter housing in such a way that when the filter insert is withdrawn from the standpipe, the standpipe remains in the clean liquid outlet.

* * * * *